United States Patent
Bell

(10) Patent No.: US 9,864,456 B2
(45) Date of Patent: Jan. 9, 2018

(54) TOUCH SENSOR ELECTRODE DRIVING

(71) Applicant: Thomas Bell, Hampshire (GB)

(72) Inventor: Thomas Bell, Hampshire (GB)

(73) Assignee: Amtel Corporation, San Jose, CA (US)

(*) Notice: Subject to any disclaimer, the term of this patent is extended or adjusted under 35 U.S.C. 154(b) by 196 days.

(21) Appl. No.: 14/977,132

(22) Filed: Dec. 21, 2015

(65) Prior Publication Data
US 2017/0177137 A1    Jun. 22, 2017

(51) Int. Cl.
| | |
|---|---|
| G06F 3/041 | (2006.01) |
| G06F 3/044 | (2006.01) |
| G06F 3/0354 | (2013.01) |
| G06F 3/047 | (2006.01) |

(52) U.S. Cl.
CPC ........ *G06F 3/0416* (2013.01); *G06F 3/03545* (2013.01); *G06F 3/044* (2013.01); *G06F 3/047* (2013.01)

(58) Field of Classification Search
CPC .... G06F 3/0416; G06F 3/03545; G06F 3/044; G06F 3/047
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,614,587 B1* | 12/2013 | Ogirko | G06F 3/044 324/678 |
| 8,723,824 B2 | 5/2014 | Myers | |
| 2008/0309635 A1 | 12/2008 | Matsuo | |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Lisa Landis
(74) *Attorney, Agent, or Firm* — Baker Botts L.L.P.

(57) ABSTRACT

In one embodiment, a controller includes a processor and a memory, the memory storing logic. The logic is configured to perform, when executed by the processor, operations comprising detecting, in response to driving electrodes of a touch sensor with a first drive signal having a first polarity, a presence of a stylus. The presence of the stylus is detected based on a first sense signal, the first sense signal having a second polarity. The operations further comprise detecting, in response to driving the electrodes with a second drive signal having the first polarity, a second sense signal having a third polarity. The third polarity is an inverse of the second polarity. The operations further comprise driving, in response to detecting the second sense signal having the third polarity, the electrodes with a third drive signal having a fourth polarity. The fourth polarity is an inverse of the first polarity.

21 Claims, 8 Drawing Sheets

(56) References Cited

U.S. PATENT DOCUMENTS

| | | |
|---|---|---|
| 2009/0315854 A1 | 12/2009 | Matsuo |
| 2011/0061949 A1* | 3/2011 | Krah ................... G06F 3/0418 178/18.06 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2016/0239123 A1* | 8/2016 | Ye ........................ G06F 3/0416 |

* cited by examiner

TOUCH SENSOR ELECTRODE DRIVING

TECHNICAL FIELD

This disclosure generally relates to touch sensors.

BACKGROUND

In an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other appropriate device. A control panel on a household or other appliance may include a touch sensor.

There are a number of different types of touch sensors, such as (for example) resistive touch sensors, surface acoustic wave touch sensors, and capacitive touch sensors. In one example, when an object physically touches a touch screen within a touch-sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller may process the change in capacitance to determine the position of the change of capacitance within the touch sensor (e.g., within a touch sensor array of the touch sensor).

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
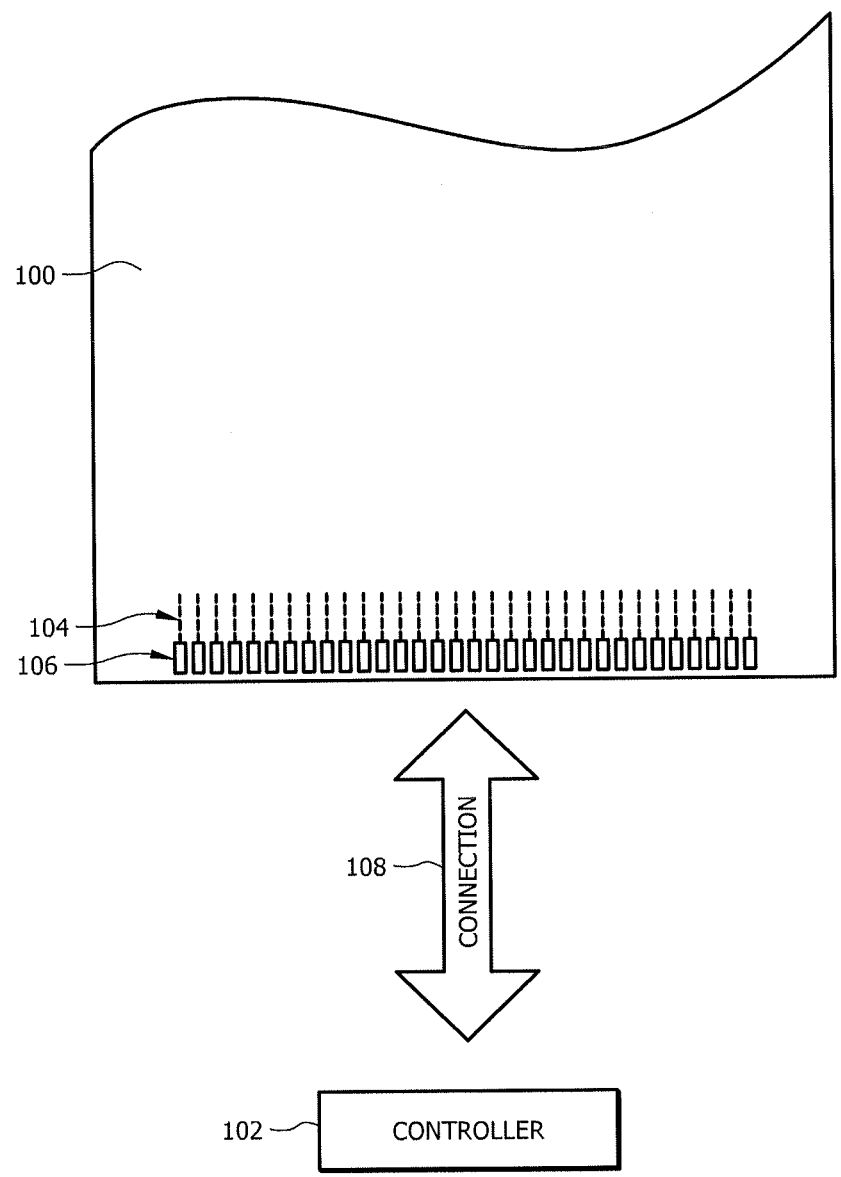
FIG. 1 illustrates an example touch sensor array with an example touch sensor controller according to an embodiment of the present disclosure.

In one example, a touch sensor detects the presence of an object (e.g., a finger or a stylus) that is physically touching a touch screen within a touch-sensitive area of a touch sensor of the touch screen (e.g., by physically touching a cover layer overlaying a touch sensor array of the touch sensor) or that is within a detection distance of the touch sensor (e.g., by hovering above the cover layer overlaying the touch sensor array of the touch sensor). For purposes of an embodiment of this description, an object (e.g., a finger or stylus) being in proximity to a touch sensor includes an object (e.g., a finger or a stylus) that is physically touching a touch screen within a touch-sensitive area of a touch sensor of the touch screen (e.g., by physically touching a cover layer overlaying a touch sensor array of the touch sensor) or that is within a detection distance of the touch sensor (e.g., by hovering above the cover layer overlaying the touch sensor array of the touch sensor). Additionally, in one embodiment, a touch sensor detecting whether an object is present includes the touch sensor detecting whether the object is in proximity to the touch sensor.

With capacitive touch sensors, to detect an object (e.g., a finger or a stylus) in proximity to a touch sensor, a touch sensor controller drives electrodes of the touch sensor with a drive signal and analyzes sense signals sensed from the same or different electrodes, depending on the touch sensing technology used. As an example, to detect a stylus in proximity to the touch sensor, the controller may drive electrodes of a touch sensor with a drive signal and analyze signals sensed from the electrodes to determine whether a signal communicated by a stylus in response to the drive signal was received.

In certain implementations, the touch sensor controller expects a sensed signal (e.g., sensed from an electrode in response to a signal from the stylus) to have a particular polarity (e.g., a positive polarity) to be considered a signal indicating proximity of a stylus. For example, the controller may disregard signals that have an inverted polarity (e.g., a negative polarity) relative to the expected polarity (e.g., a positive polarity) as not being a stylus proximity candidate. In some situations, however, sensed signals having a negative polarity actually are associated with a stylus in proximity to the touch sensor. For example, a variety of events may cause a sensed signal to have an inverted polarity even though a stylus actually is in proximity to the touch sensor. Examples of these events include a user of the device that includes the touch sensor having a palm (or other object) on or near the touch sensor while the stylus is in proximity to the touch sensor.

The present disclosure provides techniques to detect a proximity of a stylus even though another event has caused the sensed signals (e.g., sensed from an electrode in response to a signal from the stylus) to become inverted. For example, in response to sensing a signal having an inverted polarity, the controller applies an inverted drive signal to electrodes of the touch sensor, which results in the sensed signal being inverted (and therefore positive in the above example) during subsequent scans. The sensed signals thus will not be ruled out as a touch candidate simply because of an inverted polarity. When the condition causing the sensed signals to be inverted ends (e.g., the palm is removed), then the controller returns to driving the electrodes with a non-inverted drive signal.

In one embodiment, a controller includes a processor and a memory, the memory storing logic. The logic is configured to perform, when executed by the processor, operations comprising detecting, in response to driving electrodes of a touch sensor with a first drive signal having a first polarity, a presence of a stylus. The presence of the stylus is detected based on a first sense signal, the first sense signal having a second polarity. The operations further comprise detecting, in response to driving the electrodes with a second drive signal having the first polarity, a second sense signal having a third polarity. The third polarity is an inverse of the second polarity. The operations further comprise driving, in response to detecting the second sense signal having the third polarity, the electrodes with a third drive signal having a fourth polarity. The fourth polarity is an inverse of the first polarity.

FIG. 1 illustrates an example touch sensor array with an example touch sensor controller according to an embodiment of the present disclosure. Touch sensor array 100 and touch sensor controller 102 detect the presence and position of a touch or the proximity of an object within a touch-sensitive area of touch sensor array 100. Reference to a touch sensor array may encompass both touch sensor array 100 and its touch sensor controller. Similarly, reference to a touch sensor controller may encompass both touch sensor controller 102 and its touch sensor array. Touch sensor array 100 includes one or more touch-sensitive areas. In one embodiment, touch sensor array 100 includes an array of electrodes disposed on one or more substrates, which may be made of a dielectric material. Reference to a touch sensor array may encompass both the electrodes of touch sensor array 100 and the substrate(s) on which they are disposed. Alternatively, reference to a touch sensor array may encompass the electrodes of touch sensor array 100, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates electrodes made of other conductive materials forming other shapes with other fill percentages having other patterns.

The shapes of the electrodes (or other elements) of a touch sensor array 100 constitute, in whole or in part, one or more macro-features of touch sensor array 100 array 10. One or more characteristics of the implementation of those shapes (such as, for example, the conductive materials, fills, or patterns within the shapes) constitute in whole or in part one or more micro-features of touch sensor array 100. One or more macro-features of a touch sensor array 100 may determine one or more characteristics of its functionality, and one or more micro-features of touch sensor array 100 may determine one or more optical features of touch sensor array 100, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 100. For example, the mechanical stack may include a first layer of optically clear adhesive (OCA) beneath a cover panel. The cover panel may be clear and made of a resilient material for repeated touching, such as for example glass, polycarbonate, or poly(methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 100 and touch sensor controller 102. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 100 may be made of polyethylene terephthalate (PET) or another material. This disclosure contemplates any substrate with portions made of any material(s). In one embodiment, one or more electrodes in touch sensor array 100 are made of ITO in whole or in part. Additionally or alternatively, one or more electrodes in touch sensor array 100 are made of fine lines of metal or other conductive material. For example, one or more portions of the conductive material may be copper or copper-based and have a thickness of approximately 5 microns (μm) or less and a width of approximately 10 μm or less. As another example, one or more portions of the conductive material may be silver or silver-based and similarly have a thickness of approximately 5 μm or less and a width of approximately 10 μm or less. This disclosure contemplates any electrodes made of any materials.

In one embodiment, touch sensor array 100 implements a capacitive form of touch sensing. In a mutual-capacitance implementation, touch sensor array 100 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 102) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 102 measures the change in capacitance. By measuring changes in capacitance throughout the array, touch sensor controller 102 determines the position of the touch or proximity within touch-sensitive areas of touch sensor array 100.

In a self-capacitance implementation, touch sensor array 100 may include an array of electrodes of a single type that may each form a capacitive node. When an object touches or comes within proximity of the capacitive node, a change in self-capacitance may occur at the capacitive node and touch sensor controller 102 measures the change in capacitance, for example, as a change in the amount of charge implemented to raise the voltage at the capacitive node by a pre-determined amount. As with a mutual-capacitance implementation, by measuring changes in capacitance throughout the array, touch sensor controller 102 determines the position of the touch or proximity within touch-sensitive areas of touch sensor array 100. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor array 100 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 100 may have drive electrodes disposed in a pattern on one side of a substrate and sense electrodes disposed in a pattern on another side of the substrate. Moreover, touch sensor array 100 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor array 100 may indicate a touch or proximity input at the position of the capacitive node. Touch sensor controller 102 detects and processes the change in capacitance to determine the presence and position of the touch or proximity input. In one embodiment, touch sensor controller 102 then communicates information about the touch or proximity input to one or more other components (such as one or more central processing units (CPUs)) of a device that includes touch sensor array 100 and touch sensor controller 102, which may respond to the touch or proximity input by initiating a function of the device (or an application running on the device). Although this disclosure describes a particular touch sensor controller having particular functionality with respect to a particular device and a particular touch sensor, this disclosure contemplates any other touch sensor controllers having any functionality with respect to any device and any touch sensor.

In one embodiment, touch sensor controller 102 is implemented as one or more integrated circuits (ICs), such as for example general-purpose microprocessors, microcontrollers, programmable logic devices or arrays, application-specific ICs (ASICs). Touch sensor controller 102 comprises any combination of analog circuitry, digital logic, and digital non-volatile memory. In one embodiment, touch sensor controller 102 is disposed on a flexible printed circuit (FPC) bonded to the substrate of touch sensor array 100, as described below. The FPC may be active or passive. In one embodiment, multiple touch sensor controllers 102 are disposed on the FPC.

In an example implementation, touch sensor controller 102 includes a processor unit, a drive unit, a sense unit, and a storage unit. In such an implementation, the drive unit supplies drive signals to the drive electrodes of touch sensor array 100, and the sense unit senses charge at the capacitive nodes of touch sensor array 100 and provides measurement signals to the processor unit representing capacitances at the capacitive nodes. The processor unit controls the supply of drive signals to the drive electrodes by the drive unit and process measurement signals from the sense unit to detect and process the presence and position of a touch or proximity input within touch-sensitive areas of touch sensor array 100. The processor unit may also track changes in the position of a touch or proximity input within touch-sensitive areas of touch sensor array 100. The storage unit stores programming for execution by the processor unit, including programming for controlling the drive unit to supply drive signals to the drive electrodes, programming for processing measurement signals from the sense unit, and other programming. Although this disclosure describes a particular touch sensor controller having a particular implementation with particular components, this disclosure contemplates touch sensor controller having other implementations with other components.

Tracks 104 of conductive material disposed on the substrate of touch sensor array 100 couple the drive or sense electrodes of touch sensor array 100 to connection pads 106, also disposed on the substrate of touch sensor array 100. As described below, connection pads 106 facilitate coupling of tracks 104 to touch sensor controller 102. Tracks 104 may extend into or around (e.g., at the edges of) touch-sensitive areas of touch sensor array 100. In one embodiment, particular tracks 104 provide drive connections for coupling touch sensor controller 102 to drive electrodes of touch sensor array 100, through which the drive unit of touch sensor controller 102 supplies drive signals to the drive electrodes, and other tracks 104 provide sense connections for coupling touch sensor controller 102 to sense electrodes of touch sensor array 100, through which the sense unit of touch sensor controller 102 senses charge at the capacitive nodes of touch sensor array 100.

Tracks 104 are be made of fine lines of metal or other conductive material. For example, the conductive material of tracks 104 may be copper or copper-based and have a width of approximately 100 μm or less. As another example, the conductive material of tracks 104 may be silver or silver-based and have a width of approximately 100 μm or less. In one embodiment, tracks 104 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 104, touch sensor array 100 may include one or more ground lines terminating at a ground connector (which may be a connection pad 106) at an edge of the substrate of touch sensor array 100 (similar to tracks 104).

Connection pads 106 may be located along one or more edges of the substrate, outside touch-sensitive areas of touch sensor array 100. As described above, touch sensor controller 102 may be on an FPC. Connection pads 106 may be made of the same material as tracks 104 and may be bonded to the FPC using an anisotropic conductive film (ACF). In one embodiment, connection 108 include conductive lines on the FPC coupling touch sensor controller 102 to connection pads 106, in turn coupling touch sensor controller 102 to tracks 104 and to the drive or sense electrodes of touch sensor array 100. In another embodiment, connection pads 106 are connected to an electro-mechanical connector (such as a zero insertion force wire-to-board connector); in this embodiment, connection 108 may not include an FPC, if desired. This disclosure contemplates any connection 108 between touch sensor controller 102 and touch sensor array 100.

Figure 2A:
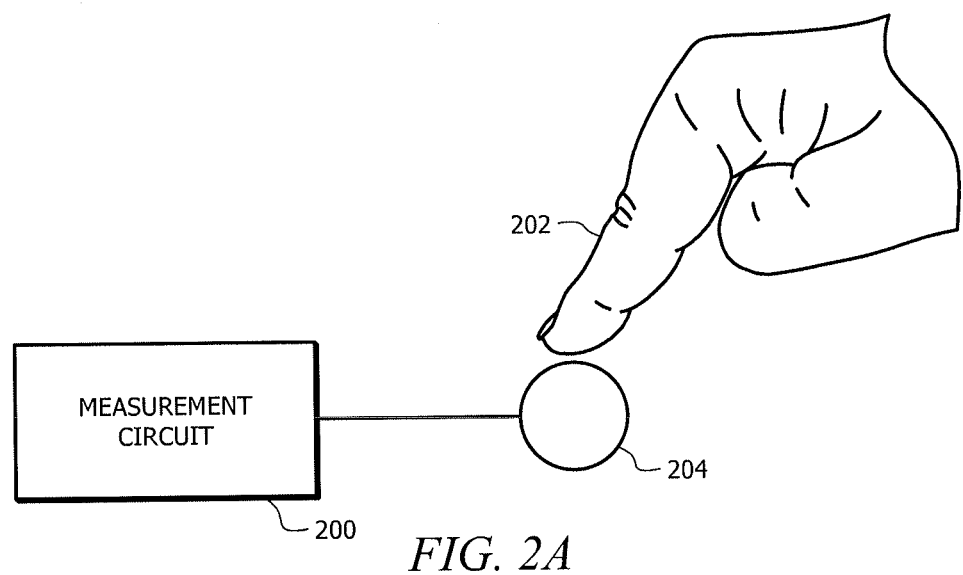
FIGS. 2A-B illustrate an example self-capacitance measurement according to an embodiment of the present disclosure.
Figure 2B:
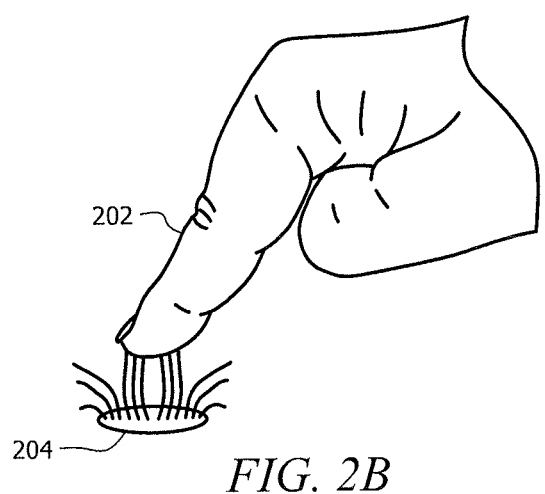

FIGS. 2A-B illustrate an example self-capacitance measurement according to an embodiment of the present disclosure. In the example of FIG. 2A, an electrode 204 of touch sensor array 100 is coupled to a measurement circuit 200. As described below, electrode 204 forms a capacitance to ground that is distributed in free space. In one embodiment, the capacitance to ground includes multiple elements, such as for example, capacitance of the tracks in the silicon, tracks on the printed circuit board (PCB), electrodes 204 made of conductive material (ITO, copper mesh, etc.), or an object 202 providing an input to electrodes 204. For example, object 202 may be part of a human body, e.g., finger or palm, or a stylus. Electrode 204 has capacitive coupling to ground through the surrounding objects that are galvanically or capacitively connected to ground. As described above, measurement circuit 200 of touch sensor controller 102 transmits a drive signal and senses a signal indicative of a touch or proximity input from object 202, such as for example a finger, through electrode 204. In one embodiment, measurement circuit 200 of touch sensor controller 102 generates the drive signal transmitted by electrode 204 and senses the capacitance to ground. The capacitance of the surrounding material includes at least in part, the capacitance between electrode 204 and ground with object 202 providing the touch or proximity input. For example, the capacitance provided by object 202 providing the touch or proximity input may add 5-10% of the capacitance sensed by electrode 204.

In the example of FIG. 2B, the signal transmitted by electrode 204 generates an electric field that emanates from electrode 204 to a signal ground of touch sensor array 100. The signal ground is galvanically or capacitively coupled to ground. The presence of an object 202, such as for example finger, affects the electric field and in turn the amount of charge sensed at electrode 204 by measurement circuit 200. As object 202 approaches electrode 204, the capacitance between electrode 204 and ground detected by measurement circuit 200 increases. In one embodiment, the increase of the capacitance between electrode 204 and ground may be measured by measurement circuit 200 as a decrease of voltage at the capacitance between electrode 204 and ground. In one embodiment, measurement circuit 200 may be alternately toggled between the drive and sense electrodes of a touch sensor in a mutual capacitance configuration. Although this disclosure describes the measurement circuit being integrated with a touch sensor controller, this disclosure contemplates a measurement circuit being a discrete circuit or part of any circuit.

Figure 3:
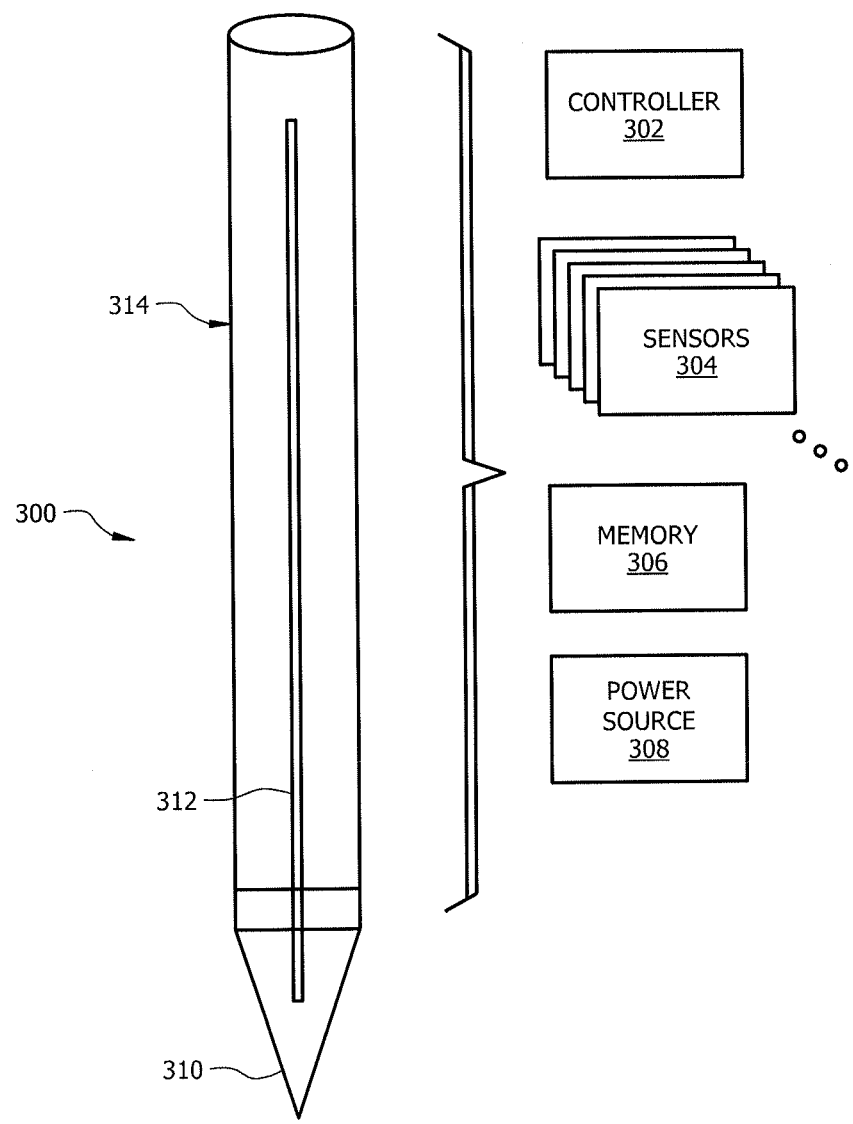
FIG. 3 illustrates example components of an active stylus according to an embodiment of the present disclosure.

FIG. 3 illustrates example components of an active stylus 300 according to an embodiment of the present disclosure. Active stylus 300 includes one or more components, such as controller 302, sensors 304, memory 306, and power source 308. In one embodiment, one or more components are configured to provide for interaction between active stylus 300 and a user or between a device and a user. For example, interactions include communication between active stylus 300 and a device, enabling or altering functionality of active stylus 300 or a device, or providing feedback to or accepting input from one or more users. As another example, active stylus 300 may communicate via any applicable short distance, low energy data transmission or modulation link, such as, for example, via a radio frequency (RF) communication link. In that implementation case, active stylus 300 includes a RF device for transmitting data over the RF link.

In one embodiment, controller 302 is implemented as a microcontroller or another type of processor for controlling the operation of active stylus 300. As a particular example, controller 302 is implemented as one or more ICs—such as, for example, general-purpose microprocessors, microcontrollers, PLDs, PLAs, or ASICs. In an example implementation, controller 302 includes a processor unit, a drive unit, a sense unit, and a storage unit. The drive unit supplies signals to electrodes of tip 310 through center shaft 312. The drive unit may also supply signals to control or drive sensors 304 or one or more external components of active stylus

300. In one embodiment, the drive unit of active stylus 300 is configured to continuously (or at other time intervals or in response to other events) transmit a signal that may be detected by electrodes of touch sensor array 100. For example, the drive unit of active stylus 300 may include a voltage pump, an oscillator, or a switch, such that the voltage pump may generate a high voltage signal, the oscillator may generate a waveform such as a square wave or a sine wave, or the switch may toggle the potential of tip 310 between zero voltage and a maximum voltage. The drive unit of active stylus 300 may transmit a signal, such as a square wave or sine wave, that may be sensed by the electrodes.

The sense unit senses signals received by electrodes of tip 310 through center shaft 312 and provides measurement signals to the processor unit representing input from a device. The sense unit may also sense signals generated by sensors 304 or one or more external components and provide measurement signals to the processor unit representing input from a user. The processor unit controls the supply of signals to the electrodes of tip 310 and processes measurement signals from the sense unit to detect and process input from the device. The processor unit may also process measurement signals from sensors 304 or one or more external components. The storage unit stores programming for execution by the processor unit, including programming for controlling the drive unit to supply signals to the electrodes of tip 310, programming for processing measurement signals from the sense unit corresponding to input from the device, programming for processing measurement signals from sensors 304 or external components to initiate a pre-determined function or gesture to be performed by active stylus 300 or the device, and other programming. For example, programming executed by controller 302 may electronically filter signals received from the sense unit. Although this disclosure describes a particular controller 302 having a particular implementation with particular components, this disclosure contemplates any controller having any implementation with any components.

In one embodiment, active stylus 300 includes one or more sensors 304, such as touch sensors, gyroscopes, accelerometers, contact sensors, or any other type of sensors that detect or measure data about the environment in which active stylus 300 operates. Sensors 304 may detect and measure one or more characteristic of active stylus 300, such as acceleration or movement, orientation, contact, pressure on outer body 314, force on tip 310, vibration, or any other characteristic of active stylus 300. For example, sensors 304 may be implemented mechanically, electronically, or capacitively. As described above, data detected or measured by sensors 304 communicated to controller 302 may initiate a pre-determined function or gesture to be performed by active stylus 300 or the device. In one embodiment, data detected or received by sensors 304 may be stored in memory 306. Memory 306 is any form of memory for storing data in active stylus 300. Controller 302 may access data stored in memory 306. For example, memory 306 may store programming for execution by the processor unit of controller 302. As another example, data measured by sensors 304 may be processed by controller 302 and stored in memory 306.

Power source 308 is any type of stored-energy source, including electrical or chemical-energy sources, for powering the operation of active stylus 300. In one embodiment, power source 308 is charged with energy from a user or device. For example, power source 308 may be a rechargeable battery that is charged by motion induced on active stylus 300. In other particular embodiments, power source 308 of active stylus 300 provides power to or receives power from the device or other external power source. For example, power may be inductively transferred between power source 308 and a power source of the device or other external power source, such as a wireless power transmitter. Additionally or alternatively, power source 308 may be powered by a wired connection through an applicable port coupled to a power source.

Figure 4:
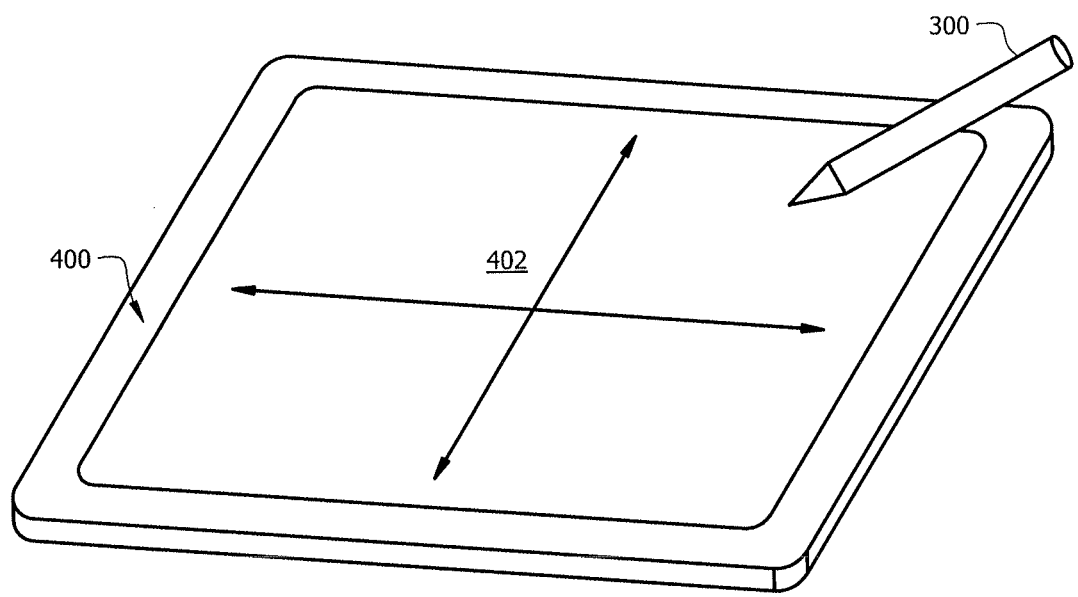
FIG. 4 illustrates an example stylus input to a device according to an embodiment of the present disclosure.

FIG. 4 illustrates an example stylus input to a device according to an embodiment of the present disclosure. Device 400 may have a display and a touch sensor array 100 with a touch-sensitive area 402. The display of device 400 is any type of display, such as a liquid crystal display (LCD), a LED display, a LED-backlight LCD display, an active-matrix organic LED (AMOLED) display, or other display, and may be visible though a cover panel and substrate (and the drive and sense electrodes of touch sensor array 100 disposed on it) of device 400. Although this disclosure describes a particular device display and particular display types, this disclosure contemplates any device display and any display types.

Device 400 electronics provide the functionality of device 400. For example, device 400 electronics may include circuitry or other electronics for wireless communication to or from device 400, execute programming on device 400, generating graphical or other user interfaces (UIs) for device 400 display to display to a user, managing power to device 400 from a battery or other power source, taking still pictures, recording video, other functionality, or any combination of these. Although this disclosure describes particular device electronics providing particular functionality of a particular device, this disclosure contemplates any device electronics providing any functionality of any device.

Touch sensor controller 102 of device 400 may operate in one or more modes. In one embodiment, with respect to stylus interaction, touch sensor controller 102 may operate in at least the following two modes: "stylus not detected" and "stylus detected." In the "stylus not detected" mode, touch sensor controller 102 may interleave or otherwise mix self-capacitance, mutual capacitance, and active stylus 300 "not detected" mode measurements to detect touch or proximity inputs, including, for example, the presence of active stylus 300 during the same measurement cycle. Each of these types of measurements may be used to detect certain types of inputs performed on or above touch-sensitive area 402. For example, touch sensor controller 102 may use self-capacitance measurements to detect certain touch or proximity inputs. In one embodiment, touch sensor controller 102 may use self-capacitance measurements to detect single-finger touches or large area palm touches. As another example, touch sensor controller 102 may use mutual capacitance measurements to detect certain touch or proximity inputs. In one embodiment, touch sensor controller 102 may use mutual capacitance measurements to detect multiple small touches or multi-touch input. As described below, touch sensor controller 102 may make the "stylus not detected" measurements using a modified self-capacitance measurement configured to provide position data of active stylus 300 above touch-sensitive area 402; however, the present disclosure contemplates touch sensor controller 102 making the "stylus not detected" measurements using any technique.

Although particular measurement types are described as being used to detect particular types of touch or proximity inputs, the present disclosure contemplates using any type of measurement to detect any type of touch or proximity input. For example, the present disclosure contemplates using any of the above-described measurement types to detect any type of touch or proximity input. As used herein, the terms "touch" and "proximity" may be used interchangeably to refer to both physical touches (e.g., of touch sensor array 100 or a cover layer overlaying touch sensor array 100) by an object (e.g., a finger, palm, stylus, or other object) and presence of an object (e.g., a finger, palm, stylus, or other object) within a detectable range of touch sensor array 100 where the object does not necessarily physically contact touch sensor array 100 (or a cover layer overlaying touch sensor array 100). For example, a touch or proximity input may refer to an input where an object is in physical contact with the cover panel of a device. Additionally or alternatively, a touch or proximity input may refer to detecting an object within a particular distance (e.g., hovering) over the cover panel (e.g., hovering).

In one embodiment, when touch sensor controller of device 400 has detected active stylus 300 within touch-sensitive area 402, touch sensor controller 102 may enter (or remain in, if appropriate) the "stylus detected" mode. In the "stylus detected" mode, touch sensor controller 102 may discontinue some measurements (e.g., self-capacitance and mutual capacitance, if appropriate) and perform measurements specific to communicating with active stylus 300. In one embodiment, the "stylus detected" mode may use a communication scheme between active stylus 300 and device 400 that includes a synchronization phase and a listen phase. For example, in the synchronization phase active stylus 300 may be synchronized to device 400 prior to the communication of other data between active stylus 300 and device 400. In one embodiment, this synchronization is performed through a synchronization ("sync") signal transmitted by the electrodes of touch-sensitive area 402 to active stylus 300. In one embodiment, the synchronization signal comprises a pre-determined bit sequence, e.g., a pulse wave. For example, the synchronization signal may be a square wave, sine wave, or any voltage waveform. Although particular techniques for interleaving or otherwise mixing different proximity detection modes are described, the present disclosure contemplates interleaving or otherwise mixing proximity detection modes according to any desired implementation.

In one embodiment, in the listen phase, active stylus 300 detects the synchronization signal and active stylus 300 responds with a communication signal (e.g., a series of pulses) onto which data is encoded. For example, touch sensor controller 102 may sample integrators connected to electrodes of touch-sensitive area 402 at pre-determined time intervals that correspond to the frequency of the synchronization signal. In one embodiment, the synchronization signal may initiate, provide for, or terminate the communication signal between active stylus 300 and one or more devices 400 or one or more users.

As a particular example of communication between the touch sensor and stylus 300, a header is a signal transmitted from touch controller 102 to stylus 300 via one or more electrodes 204. In one embodiment, a header includes one or more signal pulses upon which information is encoded. Stylus 300 listens for these pulses and responds once it has received a complete set of pulses (e.g., a complete "header"). The header (e.g., the one or more signal pulses transmitted from touch controller 102 via one or more electrodes 204) has a polarity. In one embodiment, the response from stylus 300 includes one or more signal pulses upon which information is encoded for transmission to touch controller 102 via one or more electrodes 204. The response signal transmitted by stylus 300 has a polarity.

When the housing of device 400 is held by the user, the electrodes of device 400 are capacitively coupled to the hand that is holding device 400 through the self-capacitance of the electrodes of device 400 and the body of the user. An object, such as a finger or stylus, in proximity to the electrodes defining touch-sensitive area 402 may initiate a transfer of an amount of charge between the object and the electrodes of device 400. Given the user is holding the outer body of active stylus 300, which is coupled to a local ground of active stylus 300, the user can couple a signal (e.g., a synchronization signal) transmitted by device 400 to the local ground of active stylus 300. This capacitive coupling may reduce or invert the signal referenced to the local ground of active stylus 300. For example, if the user places a large area touch (e.g., through a palm touch) located above the electrodes of touch sensor array 100 that receive the applied signal, the applied signal may be coupled into the local ground of active stylus 300 through the user holding device 400.

As described above, the sense unit of active stylus 300 may be capacitively coupled to the electrodes of touch sensor array 100, such that the sense unit of active stylus 300 may receive a differential (e.g., the edges) of the applied signal transmitted by the electrodes of touch sensor array 100. The amplitude of the applied signal received by the sense unit of active stylus 300 may depend on any combination of the amplitude of the applied signal, the coupling between the electrodes, and the slew rate of the edges of the applied signal. Furthermore, a large-area touch within touch-sensitive area 402 of touch sensor array 100 may create capacitive loading on the electrodes of touch sensor array 100 that may alter the applied signal received by active stylus 300. For example, the capacitive loading from a large-area touch within touch-sensitive area 402 may reduce the slew rate of the edges of the applied signal. In some instances, the capacitive coupling of the signal through the user may be reduced by excluding electrodes underneath a touch input from receiving the signal and transmitting the signal using the remaining electrodes.

Figure 5:
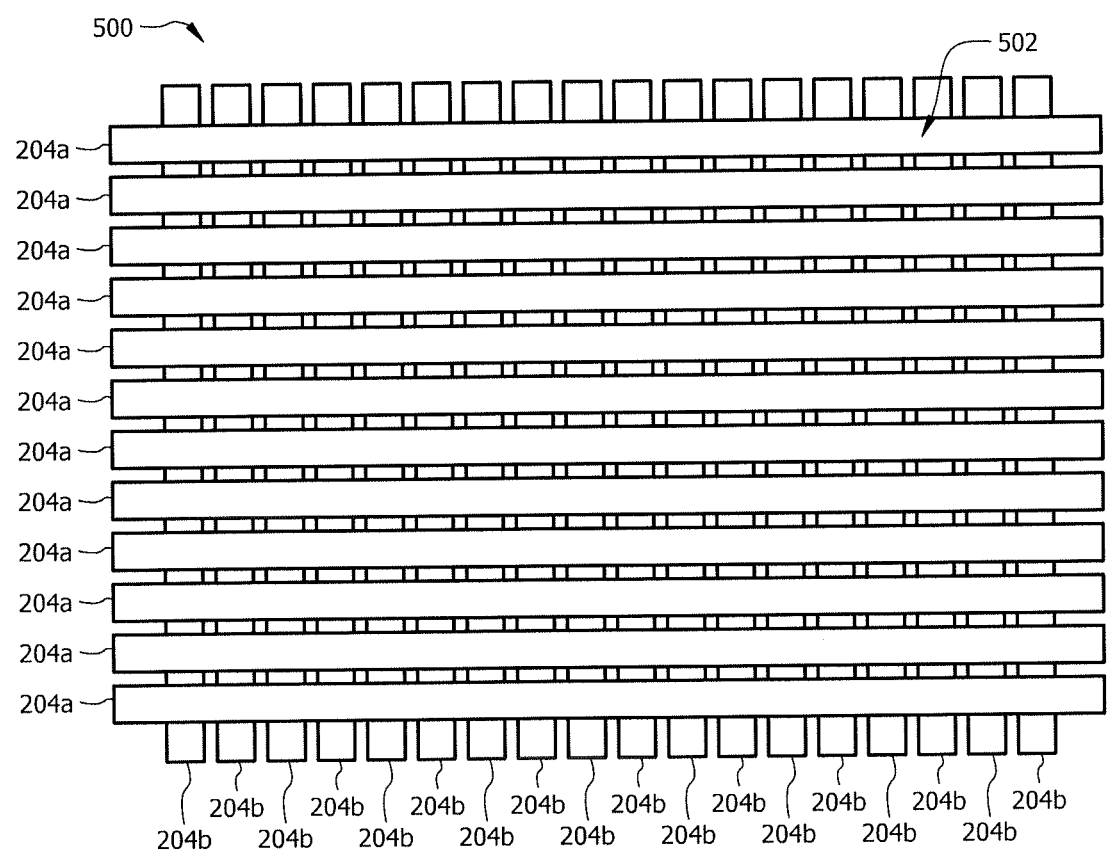
FIG. 5 illustrates in plan view an example arrangement of electrodes of a touch sensor, according to an embodiment of the present disclosure.

FIG. 5 illustrates in plan view an example electrode pattern 500 of electrodes 204 of touch sensor array 100, according to an embodiment of the present disclosure. Electrodes 204a are oriented in a first direction and electrodes 204b are oriented in a second direction different from the first direction, such that touch-sensitive area 402 of touch sensor array 100 is defined by the two-dimensional array of electrodes 204a and electrodes 204b. In the illustrated example, the first direction and the second direction are perpendicular to each other. Electrodes 204a and electrodes 204b may be described based on their orientation in touch sensor array 100. For example, electrodes oriented along a horizontal direction (electrodes 204a in the illustrated example) may be referred to as x-electrodes and electrodes oriented along a vertical direction (electrodes 204b in the illustrated example) may be referred to as y-electrodes.

Electrodes 204a and electrodes 204b overlap at points along the electrodes. In a mutual capacitive mode of operation, capacitive nodes are formed at areas (e.g., area 26) where electrodes 204 overlap when one of electrodes 204a and 204b operates as a drive electrode and the other of electrodes 204a and 204b operates as a sense electrode and when a drive signal is applied to the electrodes 204 operating as drive electrodes.

In one embodiment, electrodes 204a and electrodes 204b are disposed on the same side of a substrate. In such embodiments, to ensure that electrodes 204a and electrodes 204b are electrically isolated from one another, electrodes 204*a* and electrodes 204*b* are separated by a dielectric or other material at points where electrodes 204*a* and electrodes 204*b* overlap. In certain other embodiments, electrodes 204*a* and electrodes 204*b* are disposed on opposing sides of a substrate, the substrate being made of a dielectric or other material that electrically isolates electrodes 204*a* and electrodes 204*b* from one another. In certain other embodiments, electrodes 204*a* and electrodes 204*b* are disposed on respective surfaces of different substrates, which are positioned with respect to each other such that electrodes 204*a* and electrodes 204*b* are electrically isolated from each other at points where electrodes 204*a* and electrodes 204*b* overlap. For example, one or more of the substrates may be positioned between electrodes 204*a* (positioned on one of the substrates) and electrodes 204*b* (positioned on the other of the substrates) or an additional substrate, such as a dielectric substrate, or air gap is sandwiched between the two substrates on which electrodes 204*a* and electrodes 204*b* are formed.

Although this disclosure describes a touch sensor including electrodes 204 having particular orientations, this disclosure contemplates any touch sensor with electrodes having any orientations. Additionally, the particular shapes and arrangement of electrodes 204 shown and described with respect to FIG. 5 are provided for example purposes only. The present disclosure contemplates electrodes 204 having any shapes (or combination of shapes) and any arrangement (or combination of arrangement).

In one embodiment, electrodes 204*b* operate as drive electrodes and electrodes 204*a* operate as sense electrodes. In other embodiments, electrodes 204*a* operate as drive electrodes and electrodes 204*b* operate as sense electrodes. In one embodiment, both electrodes 204*a* and electrodes 204*b* operate as sense electrodes. In one embodiment, a portion or all of electrodes 204*a* are configurable to operate as sense electrodes during some measurements and as drive electrodes during other measurements. Additionally or alternatively, in one embodiment, a portion or all of electrodes 204*b* are configurable to operate as sense electrodes during some measurements and as drive electrodes during other measurements. As an example, during a first mode of operation, a portion or all of electrodes 204*a* and a portion or all of electrodes 204*b* operate as sense electrodes and during a second mode of operation, a portion or all of electrodes 204*b* operate as drive electrodes and a portion or all of electrodes 204*a* operate as sense electrodes.

In one particular example implementation, in a stylus detection mode, a portion or all of both electrodes 204*a* and electrodes 204*b* operate as drive electrodes during a first phase in which a drive signal is applied to the electrodes and then operate as sense electrodes during a second phase in which touch sensor array 100 awaits a response from a stylus (e.g., stylus 300) in proximity to touch sensor array 100 (if a stylus is in proximity).

As described above, in the "stylus not detected" mode, touch sensor controller 102 may perform a modified self-capacitance measurement to determine the position of an stylus (e.g., stylus 300) in proximity to touch-sensitive area 402 defined by electrodes 204*a* and electrodes 204*b*. Touch sensor controller 102 may drive a set 106A of one or more electrodes 204 of touch sensor array 100 to transmit the applied signal, e.g., synchronization signal, to search for a stylus (e.g., stylus 300) in proximity to touch sensor array 100. The position of active stylus 300 may be determined by controller 102 transmitting a synchronization signal via electrodes 204 and "listening" for a signal transmitted by stylus 300 in response to stylus 300 receiving the synchronization signal. In one embodiment, touch sensor controller 102 may apply the synchronization signal to one or more electrodes 204. For example, the signal applied to electrodes 204*a* may include a number of pulses that have an amplitude that corresponds to a pre-determined peak voltage, such as a supply voltage. Although this disclosure describes techniques for locating and synchronizing with a stylus (e.g., stylus 300) using particular voltages, this disclosure contemplates any techniques for locating and synchronizing with a stylus using any voltages.

In one embodiment, controller 102 toggles between performing a measurement for detecting of the presence of a stylus using electrodes 204*a* and performing a measurement for detecting the presence of a stylus using electrodes 204*b*. Although this technique for detecting the presence of a stylus is described, the present disclosure contemplates applying drive signals (for detecting the presence of a stylus) in any manner and using any portion of electrodes 204.

Stylus 300, when in proximity to touch sensor array 100, may transmit a signal in response to the synchronization signal transmitted by touch sensor array 100. The response signal communicated by stylus 300 may be received by one or more electrodes 204*a* and one or more electrodes 204*b* of touch sensor array 100. Touch sensor controller 102 may process the received signal to determine a position of stylus 300. For example, touch sensor controller 102 may determine that stylus 300 is located in proximity to touch sensor array 100 at the position based on identifying one or more x-electrodes and y-electrodes receiving the largest amplitude signal from stylus 300. Although a particular technique for determining position is described, the present disclosure contemplates touch sensor controller 102 determining the position of stylus 300 according to any technique.

Figure 6:
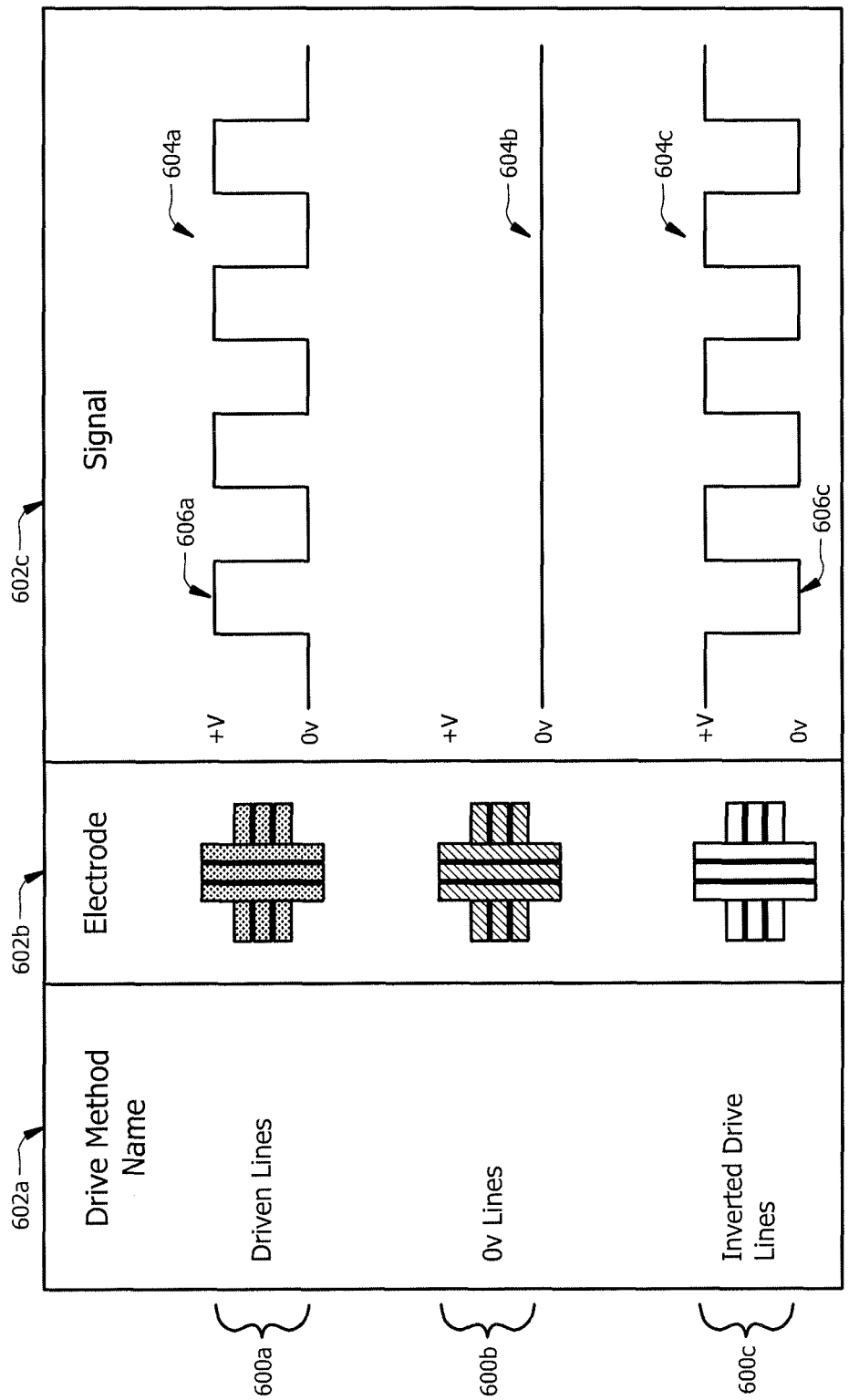
FIG. 6 illustrates example types of drive methods, according to an embodiment of the present disclosure.

FIG. 6 illustrates example types of drive methods 600, according to an embodiment of the present disclosure. Drive methods 600 are used by controller 102, for example, to apply drive signals to a portion or all of electrodes 204. During each drive method 600, a particular voltage is applied, or no voltage is applied, for a time period. Example drive methods 600*a*, 600*b*, and 600*c* are described below. Column 602*a* identifies the name of the drive method. Column 602*b* identifies the fill type used to illustrate the associated drive method. For example, a dotted fill is used to represent drive method 600*a*, a striped fill is used to represent drive method 600*b*, and a no fill is used to represent drive method 600*c*. Column 602*c* includes an illustration of an example drive signal 604 for the associated drive method 600.

Drive method 600*a* represents an example drive method in which controller 102 applies a drive signal 604*a* having a first polarity to one or more electrodes 204. In an embodiment, controller 102 is configured to apply drive signal 604*a* to electrodes 204 to search for a stylus in proximity to touch sensor array 100.

Drive method 600*b* represents an example drive method in which controller 102 applies an unmodulated signal or a zero-volt signal 604*b* to one or more electrodes 204. For simplicity, drive signal 604*b* of drive method 600*b* is referred to as zero-volt signal 604*b*.

Drive method 600*c* represents an example drive method in which controller 102 applies a drive signal 604*c* having a second polarity to one or more electrodes 204. The second polarity of drive signal 604*c* is different than the first polarity of drive signal 604*a*. In one embodiment, the second polarity of drive signal 604*c* is the inverse of the first polarity of drive signal 604*a* such that drive signal 604*c* is an inverted drive signal 604 relative to drive signal 604*a*. For example, drive signal 604c includes a peak 606c that is an inverse of corresponding peak 606a of drive signal 604a. In one embodiment, drive signal 604c and drive signal 604a have the same waveform (e.g., having the same magnitudes and periods) but are polar opposites of one another. As a particular example, drive signal 604c and drive signal 604a are both square waveforms having the same magnitudes and periods, but are polar opposites of one another. For purposes of the present disclosure, drive signal 604c may be referred to as inverted drive signal 604c.

Embodiments of the present disclosure use some or all of these different drive methods 600 and corresponding drive signals 604 (drive signal 604a, zero-volt signal 604b, and inverted drive signal 604c to cause a stylus (e.g., stylus 300) to send different types of signals to be sensed by controller 102 on electrodes 204. For example, while electrodes 204 may typically be driven using drive method 600a (drive signal 604a having the first polarity) or drive method 600b (zero-volt signal 604b), as will be described in greater detail below, it may be desirable to drive one or more electrodes 204 according to drive method 600c (using inverted drive signal 604c).

The type of drive signal 604 provided by controller 102 to electrodes 204 may affect the signal communicated by stylus 300. In one embodiment, the signal generated by stylus 300 in response to stylus 300 receiving a signal (e.g., the drive signal 604) from one or more of electrodes 204 has the same polarity as the signal stylus 300 received from the one or more electrodes 204; however, the present disclosure contemplates the signals having different polarities depending on the implementation.

Although particular types of drive signals are illustrated and described, the present disclosure contemplates using any types of drive signals. For example, although particular patterns are illustrated and described, other patterns may be used. As a particular example, although square wave drive signals are shown, the present disclosure contemplates using sine wave drive signals. Additionally, the present disclosure contemplates using drive signals having any phase(s), frequency(ies), amplitude(s), number of pulses, and other characteristics.

Figure 7:
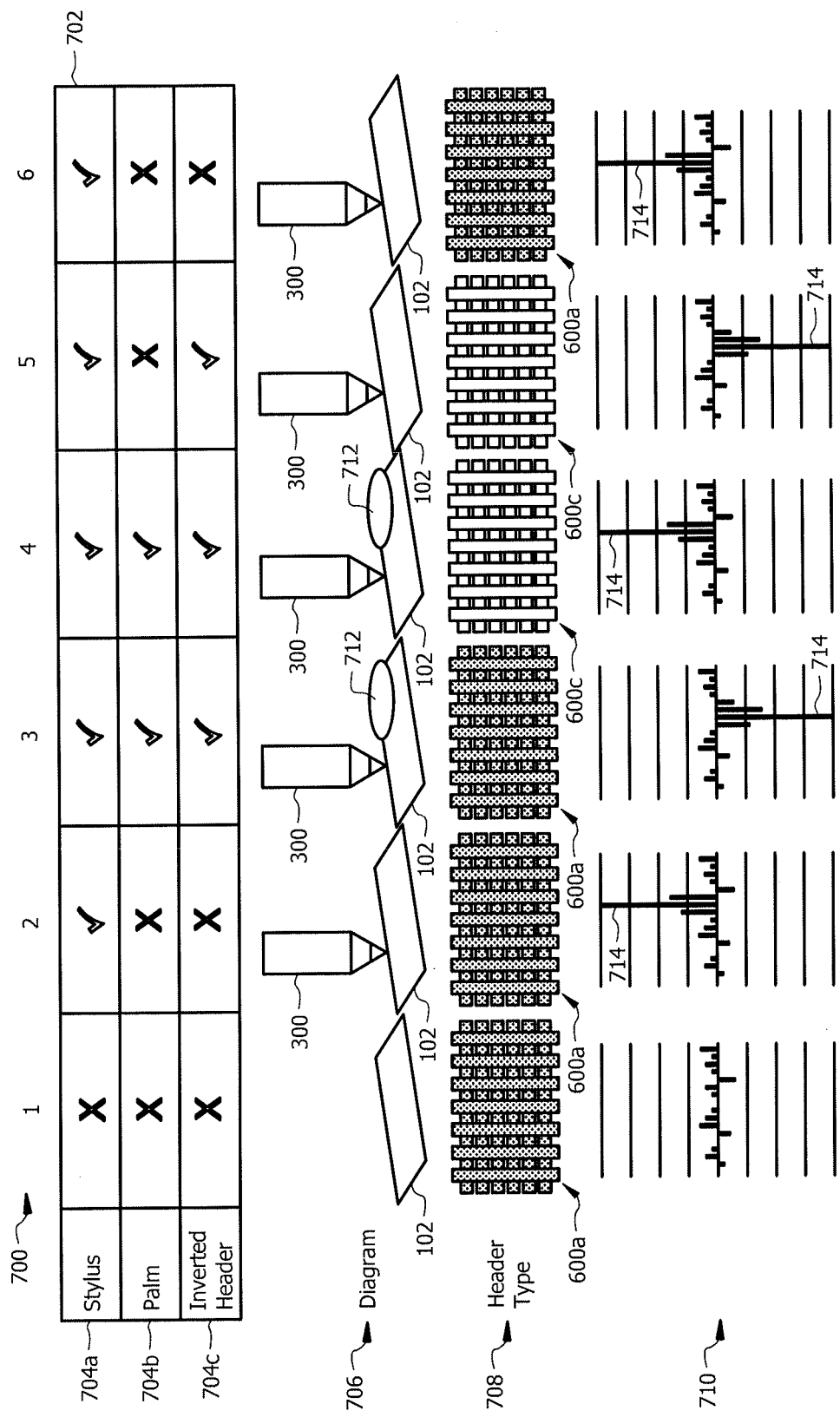
FIG. 7 illustrates example states and associated state transitions of applying the drive methods of FIG. 6, according to an embodiment of the present disclosure.

FIG. 7 illustrates example states 700 and associated state transitions of applying drive methods 600, according to an embodiment of the present disclosure. FIG. 7 includes states 700, state table 702, diagrams 706 of actual interactions occurring with respect to touch sensor array 100 during the associated state 700, header type 708, and the delta patterns 710 measured by touch sensor controller 102 during the associated state 700. States 700 (State 1, State 2, State 3, State 4, State 5, and State 6) are shown at the top of FIG. 7.

State table 702 includes rows 704a-704c. Row 704a corresponds to a state of stylus detection, with a check mark indicating that the presence of stylus 300 has been detected and an "X" indicating that the presence of stylus 300 is not currently detected. Row 704b corresponds to a state 702 in which a user's palm is in proximity to touch sensor array 100, with a check mark indicating that user's palm is in proximity to touch sensor array 100 and an "X" indicating that the user's palm is not currently in proximity to touch sensor array 100. Although an example in which a palm is or is not in proximity to touch sensor array 100 is primarily illustrated and described, the present disclosure contemplates any object (e.g., a finger, a palm, or another object) being in proximity to touch sensor array 100. Row 704c corresponds to a state of application of inverted drive signal 604c, with a check mark indicating that inverted drive signal 604c is applied to one or more electrodes 204 and an "X" indicating that inverted drive signal 604c is not applied.

Diagrams 706 represent a use state of touch sensor array 100. For example, the diagram 706 corresponding to State 1 illustrates a state in which an object is not in proximity to touch sensor array 100. As another example, the diagram 706 corresponding to State 2 illustrates a state in which a stylus (e.g., stylus 300) is in proximity to touch sensor array 100. As yet another example, State 3 corresponds to a state in which a stylus (e.g., stylus 300) and a palm 712 of a user are in proximity to touch sensor array 100.

Header type 708 represents the drive method 600 to be used by controller 102 to drive with a drive signal 604 one or more electrodes 204 of touch sensor array 100 during a particular state. In response to the drive signal 604, the one or more electrodes 204 that receive the drive signal 604 from controller 102 transmit a signal that is based on the drive signal 604 and share the characteristics (e.g., the polarity) of the drive signal 604. As described above, in one embodiment, a header is a signal transmitted from touch controller 102 to stylus 300 via one or more electrodes 204. The header may include one or more signal pulses upon which information is encoded. For example, in States 1, 2, 3, and 4, controller 102 determines to use drive method 600a in which drive signal 604a having a first polarity is applied to the one or more electrodes 204. As another example, in States 4 and 5, controller 102 determines to use drive method 600c in which inverted drive signal 604c having a second polarity is applied to the one or more electrodes 204.

Controller 102 may drive all of electrodes 204 of example electrode pattern 500 with the particular drive signal 604 associated with the drive method 600. Alternatively, controller 102 may drive a subset of electrodes 204 of electrode pattern 500 with the particular drive signal 604 associated with the drive method 600. As an example of driving a subset of electrodes 204, controller 102 may drive all of the electrodes 204 in a first layer of a touch sensor mechanical stack with the particular drive signal 604 but either apply no drive signal 604 to the electrodes 204 in another layer or apply a different drive signal 604 to the electrodes 204 in the other layer. As another example of driving a subset of electrodes 204, controller 102 may drive less than all of the electrodes 204 in a particular layer of a touch sensor mechanical stack with the particular drive signal 604 but either apply no drive signal 604 to the other electrodes 204 in the particular layer or apply a different drive signal 604 to the other electrodes 204 in the particular layer.

Delta patterns 710 represent the delta determined by controller 102 in analyzing one or more signals sensed from one or more scans of electrodes 204 for possible proximity of a stylus (e.g., stylus 300). Controller 102 may detect the presence of stylus 300 using any appropriate technique. In the illustrated example, controller 102 implements a peak detection technique in which controller 102 analyzes a signal sensed from a particular electrode 204 and compares the peak of the sensed signal to a proximity detection threshold to determine whether stylus 300 is detected as being in proximity to touch sensor array 100. The proximity detection threshold may specify an expected signal amplitude for a signal to be indicative of stylus 300 being in proximity to touch sensor array 100. For purposes of this description "meeting" a proximity detection threshold includes a value being greater than a proximity detection threshold value or being greater than or equal to a proximity detection threshold value, depending on the implementation. In one embodiment, to detect stylus 300 as being in proximity to touch sensor array 100, controller 102 expects the signal sensed from a particular electrode 204 to have a particular polarity. In one example implementation, controller 102 expects the sensed signal to have a positive polarity.

In an example implementation, for each axis of electrodes 204 (e.g., axis one being the electrodes 204 oriented in an x direction (electrodes 204a) and axis two being the electrodes 204 oriented in the y direction (electrodes 204b)), controller 102 performs two scans (scan 0 and scan 1) to determine whether stylus 300 is in proximity to touch sensor array 100 and, if so, the location of stylus 300. In one embodiment, the two scans are implemented to be sufficiently different such that a zero stylus delta does not result when stylus 300 is in proximity to touch sensor array 100). In one implementation, controller 102 identifies the greatest positive delta (or other desirable polarity) across both scans to identify the peak position (and therefore presence and location of stylus 300, if present).

In some situations, a user's palm 712 that has caused stylus 300 to transmit a negative delta will also produce a small positive delta. In this event, the small positive delta below the user's palm 712 may be interpreted incorrectly by controller 102 to be the position of stylus 300. To reduce or eliminate instances of this incorrect detection of the stylus position as the palm position, in one embodiment, a summed delta array is created in which each delta value is the sum of the absolute delta values from scan 0 and scan 1. For example, the summed delta array can be represented by the following formula:

Summed_Deltas(i)=ABS(Scan0_Deltas(i))+ABS(Scan1_Deltas(i))

In one embodiment, the value i represents each electrode 204, for example each electrode 204 in a particular direction (e.g., the x direction). In this example, the position of stylus 300, to the extent proximity of stylus 300 is detected, is determined from the peak delta in the summed array. In one embodiment, this summed delta tracking technique may allow tracking of a negative peak and add an additional level of performance by correlating deltas from two scans. In other words, rather than searching for a single peak, this summed delta tracking technique may favor electrodes 204 that show a peak in both scan 0 and scan 1. Although two stylus scans per axis are described, the present disclosure contemplates using any number of stylus scans per axis. Furthermore, although example techniques for identifying peak position are described, the present disclosure contemplates using any technique for identifying one or more peak positions.

In the illustrated and described example, a positive polarity is used to detect a presence of stylus 300 (assuming any other applicable conditions are met) and a negative polarity results in stylus 300 not being detected. The present disclosure, however, contemplates the detection polarity being positive or negative (and the rejection polarity being the reverse) without departing from the spirit and scope of the present disclosure.

In the illustrated example, certain delta patterns 710 reflect that controller 102 has not detected a peak 714, while other delta patterns reflect that either a positive or negative peak 714 has been detected. For example, the delta pattern 710 corresponding to State 1 reflects that controller 102 has not detected a peak 714. As a result of not detecting a peak 714, controller 102 may determine that no stylus 300 is in proximity to touch sensor array 100 (corresponding to the diagram of State 1, as shown in the diagram 706 corresponding to State 1). As another example, the delta patterns 710 corresponding to States 2, 4, and 6 reflect that controller 102 has detected a positive peak 714. In one embodiment, detection of a positive peak 714 that exceeds a proximity detection threshold delta value corresponds to controller 102 determining that stylus 300 is in proximity to touch sensor array 100. As yet another example, the delta patterns 710 corresponding to States 3 and 5 reflects that controller 102 has detected a negative peak 714. As described above, in one embodiment, to detect stylus 300 as being in proximity to touch sensor array 100, controller expects the signal sensed from a particular electrode 204 to have a particular polarity. In one example implementation, controller 102 expects the sensed signal to have a positive polarity. In this example, detection of a negative peak 714, regardless of whether the peak 714 exceeds a proximity detection threshold delta value as an absolute value, results in controller 102 rejecting the sensed signal as being indicative of stylus 300 in proximity to touch sensor array 100.

The details of the various states 700 will now be described.

At State 1 and as shown in state table 702, controller 102 does not detect that a stylus (e.g., stylus 300) is in proximity to touch sensor array 100. For example, in response to controller 102 using drive method 600a in which drive signal 604a having a first polarity (e.g., a positive polarity) is applied to electrodes 204, controller 102 does not detect a positive peak 714 that exceeds a stylus detection threshold (as shown at the delta 710 corresponding to State 1).

At State 2 and as shown in state table 702, controller 102 detects that a stylus (e.g., stylus 300) is in proximity to touch sensor array 100. For example, in response to controller 102 using drive method 600a in which drive signal 604a having a first polarity (e.g., a positive polarity) is applied to electrodes 204, controller 102 detects a peak 714 that has a positive polarity and exceeds a stylus detection threshold (as shown at the delta 710 corresponding to State 2).

At State 3 and as shown in state table 702, controller 102 does not detect that a stylus (e.g., stylus 300) is in proximity to touch sensor array 100 despite stylus 300 actually being in proximity to touch sensor array 100 (as shown in the diagram 706 corresponding to State 3). For example, in response to controller 102 using drive method 600a in which drive signal 604a having a first polarity (e.g., a positive polarity) is applied to electrodes 204, controller 102 does not detect a peak 714 that has a positive polarity and exceeds a stylus detection threshold (as shown at the delta 710 corresponding to State 3). As shown in the diagram 706 corresponding to State 3, a palm 712 is present in proximity to touch sensor array 100. The presence of palm 712 causes the sense signals sensed by controller 102 from electrodes 204 to have a negative polarity despite stylus 300 actually being in proximity to touch sensor array 100. Controller 102 detects that the polarity of the sensed signal is negative and, in response, drives electrodes 204 in the next state 700 with an inverted signal. Although palm 712 is described as being in proximity to touch sensor array 100, the present disclosure contemplates palm 712 causing the sensed signal to have a negative polarity even if the palm 712 is simply touching the device that includes touch sensor array 100 (e.g., the user holding the device). Additionally, although the present disclosure describes an embodiment in which a palm 712 causes the sensed signal to have a negative polarity, the present disclosure contemplates any object or other event causing the sensed signal to have a negative polarity.

The presence of palm 712 may cause the signal transmitted by stylus 300 to be inverted for any reason. In one example, stylus 300 includes a stylus amp with at least two inputs. As an example, the first input may be a positive input and the second input may be a negative input. The first input is the signal to be generated by stylus 300 in response to stylus 300 receiving a signal (e.g., the drive signal 604) from one or more of electrodes 204. In one embodiment, the signal generated by stylus 300 in response to stylus 300 receiving a signal (e.g., the drive signal 604) from one or more of electrodes 204 has the same polarity as the signal stylus 300 received from the one or more electrodes 204; however, the present disclosure contemplates the signals having different polarities depending on the implementation. The second input may depend on whether palm 712 is present. When palm 712 is not in proximity to touch sensor array 100, the second input receives a zero volt signal, due to stylus 300 being grounded by a user holding stylus 300 for example. When palm 712 is in proximity to touch sensor array 100, the second input may receive a non-zero voltage input. For example, a coupling of the palm 712 to the stylus ground may cause the second input to receive a non-zero voltage signal.

The output of the stylus amp is the signal to be transmitted by stylus 300 in response to stylus 300 receiving a signal (e.g., the drive signal 604) from one or more of electrodes 204. In one embodiment, the output of the stylus amp is an amplified version of the difference between the two inputs to the stylus amp. When the first input (e.g., the positive input) is the signal produced by stylus 300 in response to stylus 300 receiving a signal (e.g., the drive signal 604) from one or more of electrodes 204 and the second input (e.g., the negative input) is a zero volt signal (e.g., palm 712 is not present), the output of the stylus amp may have the same polarity as the signal produced by stylus 300 in response to stylus 300 receiving a signal (e.g., the drive signal 604) from one or more of electrodes 204. When the first input (e.g., the positive input) is the signal produced by stylus 300 in response to stylus 300 receiving a signal (e.g., the drive signal 604) from one or more of electrodes 204 and the second input (e.g., the negative input) is a non-zero volt signal (e.g., palm 712 is present), the output of the stylus amp may have an inverted polarity relative to the signal produced by stylus 300 in response to stylus 300 receiving a signal (e.g., the drive signal 604) from one or more of electrodes 204. For example, if the signal input to the second input is greater than the signal input to the first input, this may cause the output of the stylus amp to be have an inverted polarity relative to the signal produced by stylus 300 in response to stylus 300 receiving a signal (e.g., the drive signal 604) from one or more of electrodes 204.

At State 4 and as shown in state table 702, controller 102 detects that a stylus (e.g., stylus 300) is in proximity to touch sensor array 100. For example, in response to controller 102 using drive method 600c in which drive signal 604a having a second polarity (e.g., a negative polarity) is applied to electrodes 204, controller 102 detects a peak 714 that has a positive polarity and exceeds a stylus detection threshold (as shown at the delta 710 corresponding to State 4). Controller 102 applying a drive signal 604a having the second polarity (e.g., a negative polarity) when palm 712 is in proximity to touch sensor array 100 causes the sensed signal to have a positive polarity (e.g., as shown at the peak 714 of the delta 710 corresponding to State 4) rather than the negative polarity detected when controller 102 applied a drive signal 604 having the first polarity (e.g., a positive polarity) when palm 712 is in proximity to touch sensor array 100 (e.g., as shown at the peak 714 of the delta 710 corresponding to State 4). In the implementation described above in which stylus 300 includes a stylus amp, for example, when the first input (e.g., the positive input) is the signal produced by stylus 300 in response to stylus 300 receiving a signal (e.g., the drive signal 604) from one or more of electrodes 204 and the second input (e.g., the negative input) is a non-zero volt signal (e.g., palm 712 is present), the output of the stylus amp may have an inverted polarity relative to the signal produced by stylus 300 in response to stylus 300 receiving a signal (e.g., the drive signal 604) from one or more of electrodes 204. When electrodes 204 are driven with a signal having an inverted polarity, the signal provided to the first input of the stylus amp also is an inverted signal, which may return the output of the stylus amp to a positive polarity. As described below, controller 102 may continue to apply a drive signal 604a having the second polarity (e.g., a negative polarity) until removal of the palm 712 is detected (e.g., by peak 714 having a negative polarity in response to applying a drive signal 604 having the second polarity).

At State 5 and as shown in state table 702, controller 102 does not detect that a stylus (e.g., stylus 300) is in proximity to touch sensor array 100 despite stylus 300 actually being in proximity to touch sensor array 100 (as shown in the diagram 706 corresponding to State 5). For example, in response to controller 102 using drive method 600c in which drive signal 604a having a second polarity (e.g., a negative polarity) is applied to electrodes 204, controller 102 does not detect a peak 714 that has a positive polarity and exceeds a stylus detection threshold (as shown at the delta 710 corresponding to State 5). As shown in the diagram 706 corresponding to State 5, the palm 712 is no longer present in proximity to touch sensor array 100. The removal of palm 712 and application of a drive signal 604 having the second (e.g., negative) polarity causes the sense signals sensed by controller 102 from electrodes 204 to return to having a negative polarity despite stylus 300 actually being in proximity to touch sensor array 100. Controller 102 detects that the polarity of the sensed signal is negative and, in response, returns to driving electrodes in the next state 700 with a non-inverted signal (e.g., using drive method 600a).

At State 6 and as shown in state table 702, controller 102 detects that a stylus (e.g., stylus 300) is in proximity to touch sensor array 100. For example, in response to controller 102 using drive method 600a in which drive signal 604a having a first polarity (e.g., a positive polarity) is applied to electrodes 204, controller 102 detects a peak 714 that has a positive polarity and exceeds a stylus detection threshold (as shown at the delta 710 corresponding to State 6).

In one embodiment, even after determining to apply inverted drive signal 604c, controller 102 continues to apply (e.g., during a stylus scan phase) a drive signal 604a (e.g., having a positive polarity) in addition to applying inverted drive signal 604c (e.g., having a negative polarity). For example, controller 102 may apply drive signal 604a to electrodes 204 and then apply inverted drive signal 604c to the electrodes 204, or vice versa in time. This may be useful, for example, if multiple styluses 300 are used to provide substantially simultaneous input via touch sensor array 100. For example, one or more users may substantially simultaneously provide input to touch sensor array 100 using multiple styluses 300. As a particular example, a single user may substantially simultaneously provide input via touch sensor array 100 using a first stylus 300 held in the user's left hand and using a second stylus 300 held in the user's right hand. As another particular example, a first user may provide input via touch sensor array 100 using a first stylus 300 while a second user substantially simultaneously provides input via touch sensor array 100 using a second stylus 300.

Although both styluses 300 could transmit a signal having an inverted polarity (such that controller 102 does not detect a peak 714 for either stylus 300 that has a positive polarity, for example), in certain scenarios, the first stylus 300 in these examples may transmit an inverted signal (such that controller 102 does not detect a peak 714 for the first stylus 300 that has a positive polarity, for example) while the second stylus 300 does not transmit an inverted signal (such that controller 102 detects a peak 714 for the second stylus 300 that has a positive polarity, for example), or vice versa. If controller 102 were to drive electrodes 204 with only an inverted drive signal 604c, this may cause the second stylus 300 in this example to no longer be detected. To facilitate both the first and the second styluses 300 providing a response signal that is detected as an input (e.g., that results in a sense signal having a positive polarity, for example), controller 102 may apply drive signal 604a (e.g., having a positive polarity) to electrodes 204 and then apply inverted drive signal 604c (e.g., having a negative polarity) to the electrodes 204, or vice versa in time.

Controller 102 may apply both drive signal 604a and inverted drive signal 604c in any manner. In one embodiment, each time controller 102 determines to drive electrodes 204 with an inverted drive signal 604c, in addition to driving electrodes 204 with the inverted drive signal 604c controller 102 may also drive the electrodes 204 with drive signal 604a. This may facilitate detection of a second stylus 300 not in proximity to touch sensor array 100 when the first stylus 300 transmits an inverted signal but that is brought into proximity to touch sensor array 100 after the first stylus 300 transmits an inverted drive signal. Additionally or alternatively, controller 102 may determine whether multiple styluses 300 are detected and, if controller 102 determines that multiple styluses 300 are present, then, in addition to driving electrodes 204 with the inverted drive signal 604c, controller 102 may also drive the electrodes 204 with drive signal 604a.

The example states 700 and state transitions illustrated in and described with reference to FIG. 7 are provided as examples. In one embodiment, one or more of these states 700 may not be encountered. Additionally or alternatively, one or more states other than those illustrated may be encountered. Furthermore, although a particular order of states 700 is illustrated and primarily described, the present disclosure contemplates states 700 occurring in other orders.

Figure 8:
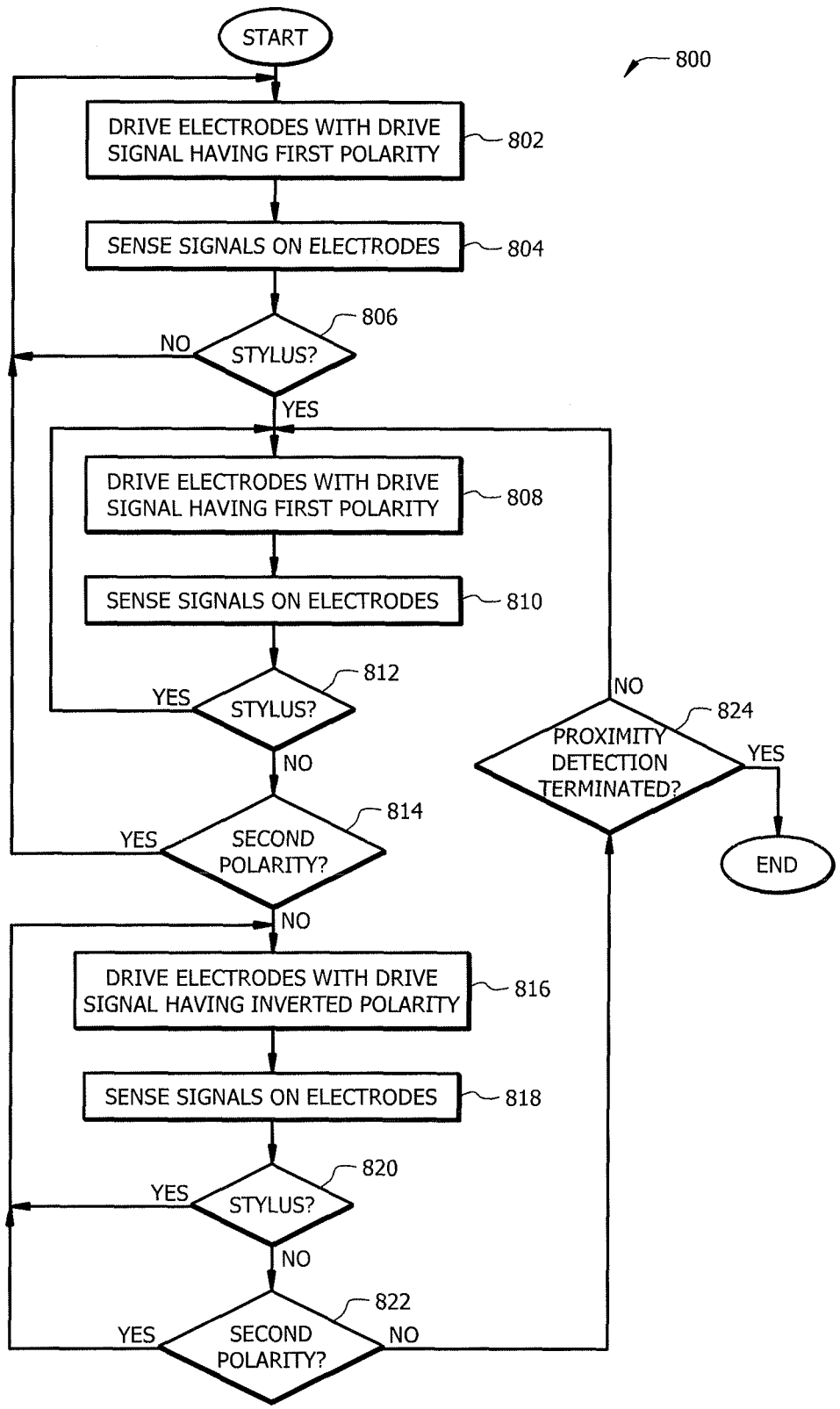
FIG. 8 illustrates an example method for detecting a presence of a stylus, according to an embodiment of the present disclosure.

FIG. 8 illustrates an example method 800 for detecting a presence of stylus 300, according to an embodiment of the present disclosure. In one embodiment, some or all of these steps are performed during a stylus scan mode of operation of controller 102. As described above, the stylus scan mode may be interleaved or otherwise mixed with other modes of operation of controller 102. Additionally, as described above, in one embodiment, controller 102 toggles between performing a scan for proximity of stylus 300 using electrodes 204 oriented in a first direction (e.g., electrodes 204a) and performing a scan for proximity of stylus 300 using electrodes oriented in a second direction (e.g., electrodes 204b) to determine a two-dimensional position of stylus 300, if detected. Additionally, although the method 800 is described with reference to stylus 300, the present disclosure contemplates detecting the presence of any stylus capable of transmitting a signal detectable by controller 102.

At step 802, controller 102 drives electrodes 204 with a drive signal 604 having a first polarity. For example, controller 102 may drive electrodes 204 using drive method 600a with drive signal 604a. The drive signal 604 may be a synchronization signal or any other type of signal to cause stylus 300 to transmit a responsive signal. In one embodiment, driving electrodes 204 with a drive signal 604 having the first polarity comprises driving electrodes 204 with a single drive signal 604 having the first polarity. Additionally or alternatively, driving electrodes 204 with a drive signal 604 having the first polarity may comprise sending separate drive signals 604, each drive signal 604 having the first polarity, to each of electrodes 204 or groups of electrodes 204. In one embodiment, the first polarity is a positive polarity. Controller 102 may apply the drive signal 604 having the first polarity to a single electrode 204, multiple but not all of electrodes 204, or all of electrodes 204.

At step 804, controller 102 senses sense signals from electrodes 204. Controller 102 may sense signals from a single electrode 204, multiple but not all of electrodes 204, or all of electrodes 204. In one embodiment, controller 102 senses signals from the same electrodes 204 driven at step 802.

At step 806, controller 102 determines, in response to driving electrodes 204 with the drive signal 604 having the first polarity, whether stylus 300 is present. In one embodiment of method 800, determining whether stylus 300 is present comprises controller 102 determining whether stylus 300 is detected in proximity to touch sensor array 100. In one example, in response to driving electrodes 204 with the drive signal 604 having the first polarity, controller 102 senses sense signals at step 804 from one or more electrodes 204 (e.g., the one or more electrodes 204 driven at step 802) and determines based on the sense signals whether stylus 300 is present.

In one scenario, controller 102 determines at step 806 that a stylus 300 is present. In one embodiment, controller 102 detecting that stylus 300 is present based on the sense signals includes controller 102 detecting that a peak of at least one sense signal (e.g., from at least one electrode 204) has a second polarity and exceeds a proximity detection threshold. In one embodiment, the second polarity is a positive polarity. In one embodiment, the first polarity and the second polarity are the same polarity (e.g., both positive). In one embodiment, detecting the presence of stylus 300 includes determining a location of stylus 300 relative to touch sensor array 100 based on the sensed signals. If controller 102 does not detect the presence of stylus 300 at step 806, then controller 102 returns to step 802 to again drive electrodes 204 with the drive signal 604 having the first polarity.

At step 808, controller 102 again drives electrodes 204 with a drive signal 604 having the first polarity. For example, controller 102 may drive electrodes 204 using drive method 600a with drive signal 604a. The drive signal 604 may be a synchronization signal or any other type of signal to cause stylus 300 to transmit a responsive signal. In one embodiment, driving electrodes 204 with a drive signal 604 having the first polarity comprises driving electrodes 204 with a single drive signal 604 having the first polarity. Additionally or alternatively, driving electrodes 204 with a drive signal 604 having the first polarity may comprise sending separate drive signals 604, each drive signal 604 having the first polarity, to each of electrodes 204 or groups of electrodes 204. In one embodiment, the first polarity is a positive polarity. Controller 102 may apply the drive signal 604 having the first polarity to a single electrode 204, multiple but not all of electrodes 204, or all of electrodes 204.

At step 810, controller 102 senses sense signals from electrodes 204. Controller 102 may sense signals from a single electrode 204, multiple but not all of electrodes 204, or all of electrodes 204. In one embodiment, controller 102 senses signals from the same electrodes 204 driven at step 808.

At step 812, controller 102 determines, in response to driving electrodes 204 with the drive signal 604 having the first polarity, whether stylus 300 is present. In one embodiment of method 800, determining whether stylus 300 is present comprises controller 102 determining whether stylus 300 is detected in proximity to touch sensor array 100. In one example, in response to driving electrodes 204 with the drive signal 604 having the first polarity, controller 102 senses sense signals at step 810 from one or more electrodes 204 (e.g., the one or more electrodes 204 driven at step 808) and determines based on the sense signals whether stylus 300 is present.

In one scenario, controller 102 determines at step 812 that a stylus 300 is present. As described above, in one embodiment, controller 102 detecting that stylus 300 is present based on the sense signals includes controller 102 detecting that a peak of at least one sense signal (e.g., from at least one electrode 204) has a second polarity and exceeds a proximity detection threshold. Furthermore, as described above, in one embodiment, detecting the presence of stylus 300 includes determining a location of stylus 300 relative to touch sensor array 100. If controller 102 determines at step 812 that a stylus 300 is present, then method 300 returns to step 808 to drive electrodes 204 with a drive signal 604 having the first polarity. If controller 102 does not detect the presence of stylus 300 at step 812, then controller 102 proceeds to step 814.

At step 814, controller 102 determines whether the sensed signals have the second polarity. The second polarity is a proximity detection polarity, which is the polarity controller 102 expects for a sensed signal to possibly indicate the presence of stylus 300 in proximity to touch sensor array 100. In one embodiment, the second polarity is the same as the first polarity used by controller 102 to drive electrodes 204 at step 808. In one embodiment, the second polarity is a positive polarity. Although step 814 is described as determining whether the sensed signals have the second polarity, the present disclosure contemplates controller 102 determining whether the sensed signals have a third polarity that is an inverse of the second polarity and, if controller 102 determines that the sensed signals do not have the third polarity, determining that the sensed signals have the second polarity.

The present disclosure contemplates controller 102 determining whether the sensed signals have the second polarity in any manner. For example, controller 102 may make an explicit determination of the polarity of the sensed signals. As another example, controller 102 may examine sensed signals for a change in polarity relative to the previously-determined polarity. In one embodiment, determining whether the sensed signals have the second polarity comprises determining whether a peak 714 of at least one sensed signal (e.g., a maximum peak 714 from the signals sense from electrodes 204) has the second polarity. Although steps 812 and 814 are illustrated and described separately, the present disclosure contemplates controller 102 performing steps 812 and 814 in essentially a consolidated manner. For example, controller 102 may determine and consider the polarity of sensed signals as part of determining whether stylus 300 is in proximity to touch sensor array 100.

If controller 102 determines at step 814 that the sensed signals have the second polarity, then the method may return to step 802 to drive electrodes 204 with a drive signal 604 having the first polarity. In one embodiment, the combination of the sensed signal having the second polarity and yet no stylus 300 being detected is due to the sensed signal (e.g., an amplitude of the sensed signal) not exceeding a proximity detection threshold. If controller 102 determines at step 814 that the sensed signals do not have the second polarity, then the method proceeds to step 816. In one embodiment, the sensed signals not having the second polarity means that the sensed signals have a third polarity that is an inverse of the second polarity. In one embodiment, when the second polarity is a positive polarity for example, the third polarity is a negative polarity. As described above, the sensed signal may have the third polarity despite stylus 300 being present due to the presence of a palm 712 or other object.

At step 816, controller 102 drives electrodes 204 with a drive signal 604 having a fourth polarity. For example, controller 102 may drive electrodes 204 using drive method 600c with inverted drive signal 604c. The drive signal 604 may be a synchronization signal or any other type of signal to cause stylus 300 to transmit a responsive signal. In one embodiment, the fourth polarity of the drive signal 604 used to drive electrodes 204 at step 816 is an inverse of the first polarity of the drive signal 604 used to drive electrodes 204 at steps 802 and 808. The drive signal 604 may be a synchronization signal or any other type of signal to cause stylus 300 to transmit a responsive signal. In one embodiment, driving electrodes 204 with a drive signal 604 having the fourth polarity comprises driving electrodes 204 with a single drive signal 604 having the fourth polarity. Additionally or alternatively, driving electrodes 204 with a drive signal 604 having the fourth polarity may comprise sending separate drive signals 604 having, each having the fourth polarity, to each of electrodes 204. In one embodiment, the fourth polarity is the same as the third polarity. In one embodiment, the fourth polarity is a negative polarity. Controller 102 may apply the drive signal 604 having the fourth polarity to a single electrode 204, multiple but not all of electrodes 204, or all of electrodes 204.

At step 818, controller 102 senses sense signals from electrodes 204. Controller 102 may sense signals from a single electrode 204, multiple but not all of electrodes 204, or all of electrodes 204. In one embodiment, controller 102 senses signals from the same electrodes 204 driven at step 816.

At step 820, controller 102 determines, in response to driving electrodes 204 with the drive signal 604 having the fourth polarity, whether stylus 300 is present. In one embodiment of method 800, determining whether stylus 300 is present comprises controller 102 determining whether stylus 300 is detected in proximity to touch sensor array 100. In one example, in response to driving electrodes 204 with the drive signal 604 having the fourth (e.g., inverted) polarity, controller 102 senses sense signals at step 818 from one or more electrodes 204 (e.g., the one or more electrodes 204 driven at step 816) and determines based on the sense signals whether stylus 300 is present.

In one scenario, controller 102 determines at step 812 that a stylus 300 is present. As described above, in one embodiment, controller 102 detecting that stylus 300 is present based on the sense signals includes controller 102 detecting that a peak of at least one sense signal has a second polarity and exceeds a proximity detection threshold. Furthermore, as described above, in one embodiment, detecting the presence of stylus 300 includes determining a location of stylus 300 relative to touch sensor array 100. If controller 102 determines at step 820 that a stylus 300 is present, then method 300 returns to step 816 to drive electrodes 204 with a drive signal 604 having the inverted polarity. If controller 102 does not detect the presence of stylus 300 at step 820, then controller 102 proceeds to step 822.

At step 822, controller 102 determines whether the sense signals sensed at step 818 have the second polarity. The second polarity is a proximity detection polarity. In one embodiment, the second polarity is the same as the first polarity used by controller to drive electrodes 204 at step 808. In one embodiment, the second polarity is a positive polarity. Although step 822 is described as determining whether the sensed signals have the second polarity, the present disclosure contemplates controller 102 determining whether the sensed signals have a third polarity that is an inverse of the second polarity and, if controller 102 determines that the sensed signals do not have the third polarity, determining that the sensed signals have the second polarity. Although steps 820 and 822 are illustrated and described separately, the present disclosure contemplates controller 102 performing steps 820 and 822 in essentially a consolidated manner. For example, controller 102 may determine and consider the polarity of sensed signals as part of determining whether stylus 300 is in proximity to touch sensor array 100.

If controller 102 determines at step 822 that the sensed signals have the second polarity, then method 800 returns to step 816 where controller 102 drives electrodes 204 with a drive signal 604 having a fourth polarity. In one embodiment, the combination of the sensed signal having the second polarity and yet no stylus 300 being detected is due to the sensed signal (e.g., an amplitude of the sensed signal) not exceeding a proximity detection threshold. If controller 102 determines at step 822 that the sensed signal does not have the second polarity, then the method proceeds to step 824. In one embodiment, the sense signal not having the second polarity means that the sense signal has a third polarity that is an inverse of the second polarity.

At step 824, controller 102 determines whether proximity detection has terminated. The present disclosure contemplates proximity detection being terminated for any reason. As just a few examples, proximity detection may be terminated due to any combination of powering down of the controller 102, powering down of the device that includes controller 102 (which may also power down controller 102), a user-specified preference, or any other reason. In one embodiment, determining whether proximity detection has been termination is not an explicit determination by controller 102, but instead simply results from the mechanism that causes proximity detection to be terminated (e.g., powering down of controller 102). In reality, proximity detection could be terminated at any point in method 800; however, for ease of description and to simplify the flow chart of FIG. 8, the termination decision is shown at a single point of the method.

If controller 102 determines at step 824 that proximity detection is terminated, then the method ends. If controller determines at step 824 that proximity detection has not terminated, then the method returns to step 808 where controller 102 drives electrodes 204 with a drive signal 604 having the first polarity. As can be understood from the flow chart of FIG. 8 and the associated description, when the cause of the inversion of the sensed signal at steps 808-816 is removed (e.g., a user removes the palm 712 from the screen), then controller reverts to driving electrodes 204 with a drive signal 604 having the first polarity. For example, as described above, the removal of palm 712 and application of a drive signal 604 having the second (e.g., negative) polarity causes the sense signals sensed by controller 102 from electrodes 204 to return to having a negative polarity despite stylus 300 actually being in proximity to touch sensor array 100. Controller 102 detects that the polarity of the sensed signal is negative and, in response, returns to driving electrodes with a non-inverted signal (e.g., using drive method 600a).

The example method described with respect to FIG. 8 illustrates a scenario in which controller 102 detects stylus 300 (at step 806) before determining a polarity of sensed signals in response to a determination that stylus 300 is not present (at step 812 and for possible inversion of a drive signal 604 at step 814 through 816). Although this scenario is illustrated and primarily described, the present disclosure contemplates controller 102 determining the polarity of sensed signals in response to a first determination that stylus 300 is not detected without first detecting a presence of stylus 300. For example, the present disclosure contemplates the method of FIG. 8 proceeding from step 804 to step 812 without controller 102 performing steps 806 through 810.

Furthermore, as described above with reference to FIG. 7, in one embodiment, even after determining to apply inverted drive signal 604c, controller 102 continues to apply (e.g., during a stylus scan phase) a drive signal 604a (e.g., having a positive polarity) in addition to applying inverted drive signal 604c (e.g., having a negative polarity). For example, controller 102 may apply drive signal 604a to electrodes 204 and then apply inverted drive signal 604c to the electrodes 204, or vice versa in time.

Although this disclosure describes and illustrates particular steps of the method of FIG. 8 as occurring in a particular order, this disclosure contemplates steps of the method of FIG. 8 occurring in any order. Particular embodiments may repeat one or more steps of the method of FIG. 8. Moreover, although this disclosure describes and illustrates an example method for detecting a presence of a stylus using an inverted drive signal 604 including the particular steps of the method of FIG. 8, this disclosure contemplates any method for detecting a presence of a stylus using an inverted drive signal 604 including any steps, which may include all, some, or none of the steps of the method of FIG. 8. Moreover, although this disclosure describes and illustrates particular components performing particular steps of the method of FIG. 8, this disclosure contemplates any combination of any components performing any steps of the method of FIG. 8.

Figure 9:
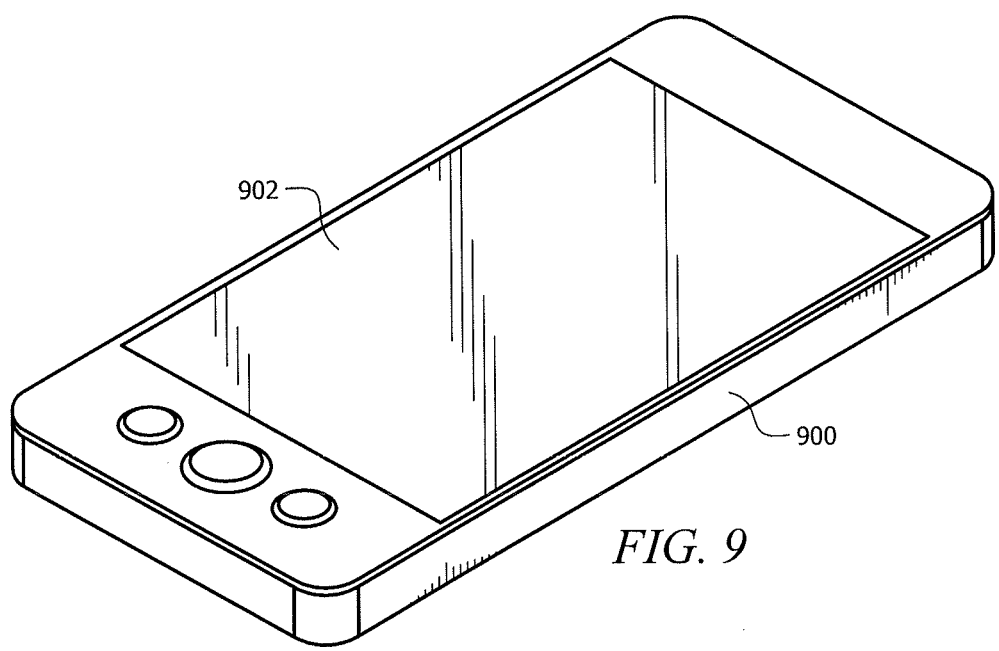
FIG. 9 illustrates an example device that uses the touch sensor of FIG. 1, according to an embodiment of the present disclosure.

FIG. 9 illustrates an example device 900 that uses touch sensor array 100 of FIG. 1, according to an embodiment of the present disclosure. Device 900 includes any personal digital assistant, cellular telephone, smartphone, tablet computer, and the like. In one embodiment, device 900 includes other applications such as automatic teller machines (ATMs), home appliances, personal computers, and any other such device having a touch screen. For example, a certain embodiment of device 900 is a smartphone that includes a touch screen display 902 occupying a significant portion of a surface of the device. In one embodiment, the large size of touch screen display 902 allows the touch screen display 902 to present a wide variety of data, including a keyboard, a numeric keypad, program or application icons, and various other interfaces as desired. In one embodiment, a user interacts with device 900 by touching touch screen display 902 with a stylus, a finger, or any other appropriate object in order to interact with device 900 (e.g., select a program for execution or to type a letter on a keyboard displayed on the touch screen display 902). In one embodiment, a user interacts with device 900 using multiple touches to perform various operations, such as to zoom in or zoom out when viewing a document or image. In some embodiments, such as home appliances, touch screen display 902 does not change or changes only slightly during device operation, and recognizes only single touches.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses a myriad of changes, substitutions, variations, alterations, and modifications to the example embodiments herein that a person having ordinary skill in the art would comprehend. Similarly, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, comprising:
   a touch sensor comprising a plurality of electrodes; and
   a controller configured to perform operations comprising:
      driving the plurality of electrodes with a first drive signal having a first polarity;
      detecting, in response to driving the plurality of electrodes with the first drive signal having the first polarity, a presence of a stylus, the presence of the stylus detected based on a first sense signal, the first sense signal having a second polarity;
      driving the plurality of electrodes with a second drive signal having the first polarity;
      detecting, in response to driving the plurality of electrodes with the second drive signal having the first polarity, a second sense signal, the second sense signal having a third polarity, the third polarity being an inverse of the second polarity; and
      driving, in response to detecting the second sense signal having the third polarity, the plurality of electrodes with a third drive signal having a fourth polarity, the fourth polarity being an inverse of the first polarity.

2. The apparatus of claim 1, wherein the controller is further configured to perform operations comprising detecting, in response to driving the plurality of electrodes with the third drive signal having the fourth polarity that is the inverse of the first polarity, a presence of the stylus, the presence of the stylus detected based on a third sense signal, the third sense signal having the second polarity.

3. The apparatus of claim 2, wherein the controller is further configured to perform operations comprising:
   driving the plurality of electrodes with a fourth drive signal having the third polarity;
   detecting, in response to driving the plurality of electrodes with the fourth drive signal having the third polarity, a fourth sense signal, the fourth sense signal having the third polarity; and
   driving, in response to detecting the fourth sense signal having the third polarity, the plurality of electrodes with a fifth drive signal having the first polarity.

4. The apparatus of claim 2, wherein:
   detecting the presence of a stylus based on the first sense signal comprises detecting that a first peak of the first sense signal has the second polarity and meets a proximity detection threshold; and
   detecting the presence of the stylus based on the third sense signal comprises detecting that the third sense signal has the second polarity and meets the proximity detection threshold.

5. The apparatus of claim 1, wherein the first polarity and the second polarity are the same polarity.

6. The apparatus of claim 1, wherein the first polarity and the second polarity are a positive polarity.

7. The apparatus of claim 1, wherein the third polarity and the fourth polarity are the same polarity.

8. The apparatus of claim 1, wherein the third polarity and the fourth polarity are a negative polarity.

9. The apparatus of claim 1, wherein the plurality of electrodes comprises:
   a first plurality of electrodes extending in a first direction; and
   a second plurality of electrodes extending in a second direction.

10. A controller, comprising:
    a processor;
    a memory coupled to the processor and storing logic, the logic configured to perform, when executed by the processor, operations comprising:
       detecting, in response to driving a plurality of electrodes of a touch sensor with a first drive signal having a first polarity, a presence of a stylus, the presence of the stylus detected based on a first sense signal, the first sense signal having a second polarity;
       detecting, in response to driving the plurality of electrodes with a second drive signal having the first polarity, a second sense signal, the second sense signal having a third polarity, the third polarity being an inverse of the second polarity; and
       driving, in response to detecting the second sense signal having the third polarity, the plurality of electrodes with a third drive signal having a fourth polarity, the fourth polarity being an inverse of the first polarity.

11. The controller of claim 10, wherein the logic is further configured to perform, when executed, operations comprising detecting, in response to driving the plurality of electrodes with the third drive signal having the fourth polarity that is the inverse of the first polarity, a presence of the stylus, the presence of the stylus detected based on a third sense signal, the third sense signal having the second polarity.

12. The controller of claim 11, wherein the logic is further configured to perform, when executed, operations comprising:

driving the plurality of electrodes with a fourth drive signal having the third polarity;

detecting, in response to driving the plurality of electrodes with the fourth drive signal having the third polarity, a fourth sense signal, the fourth sense signal having the third polarity; and driving, in response to detecting the fourth sense signal having the third polarity, the plurality of electrodes with a fifth drive signal having the first polarity.

13. The controller of claim 11, wherein:

detecting the presence of a stylus based on the first sense signal comprises detecting that a first peak of the first sense signal has the second polarity and meets a proximity detection threshold; and detecting the presence of the stylus based on the third sense signal comprises detecting that the third sense signal has the second polarity and meets the proximity detection threshold.

14. The controller of claim 10, wherein the first polarity and the second polarity are the same polarity.

15. The controller of claim 10, wherein the first polarity and the second polarity are a positive polarity.

16. The controller of claim 10, wherein the third polarity and the fourth polarity are the same polarity.

17. The controller of claim 10, wherein the third polarity and the fourth polarity are a negative polarity.

18. The controller of claim 10, wherein the plurality of electrodes comprises:

a first plurality of electrodes extending in a first direction; and a second plurality of electrodes extending in a second direction.

19. A method, comprising:

detecting, in response to driving a plurality of electrodes of a touch sensor with a first drive signal having a first polarity, a presence of a stylus, the presence of the stylus detected based on a first sense signal, the first sense signal having a second polarity;

detecting, in response to driving the plurality of electrodes with a second drive signal having the first polarity, a second sense signal, the second sense signal having a third polarity, the third polarity being an inverse of the second polarity; and driving, in response to detecting the second sense signal having the third polarity, the plurality of electrodes with a third drive signal having a fourth polarity, the fourth polarity being an inverse of the first polarity.

20. The method of claim 10, further comprising detecting, in response to driving the plurality of electrodes with the third drive signal having the fourth polarity that is the inverse of the first polarity, a presence of the stylus, the presence of the stylus detected based on a third sense signal, the third sense signal having the second polarity.

21. The method of claim 11, further comprising:

driving the plurality of electrodes with a fourth drive signal having the third polarity;

detecting, in response to driving the plurality of electrodes with the fourth drive signal having the third polarity, a fourth sense signal, the fourth sense signal having the third polarity; and driving, in response to detecting the fourth sense signal having the third polarity, the plurality of electrodes with a fifth drive signal having the first polarity.

* * * * *